US012774907B2

(12) United States Patent
Tsutsumi et al.

(10) Patent No.: US 12,774,907 B2
(45) Date of Patent: Oct. 27, 2026

(54) POWER GENERATION ELEMENT, ENCODER, METHOD OF MANUFACTURING MAGNETIC MEMBER, AND SIGNAL ACQUISITION METHOD

(71) Applicant: Panasonic Intellectual Property Management Co., Ltd., Osaka (JP)

(72) Inventors: Shinichi Tsutsumi, Kyoto (JP); Keiichiro Nukada, Nara (JP); Tomoyuki Muranishi, Osaka (JP); Akihiko Watanabe, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 303 days.

(21) Appl. No.: 18/555,516

(22) PCT Filed: Apr. 11, 2022

(86) PCT No.: PCT/JP2022/017528
§ 371 (c)(1),
(2) Date: Oct. 14, 2023

(87) PCT Pub. No.: WO2022/230652
PCT Pub. Date: Nov. 3, 2022

(65) Prior Publication Data

US 2024/0200987 A1 Jun. 20, 2024

(30) Foreign Application Priority Data

Apr. 26, 2021 (JP) ................................ 2021-073968

(51) Int. Cl.
*G01D 5/245* (2006.01)
*H01F 27/24* (2006.01)
*H01F 27/28* (2006.01)

(52) U.S. Cl.
CPC ............ *G01D 5/245* (2013.01); *H01F 27/24* (2013.01); *H01F 27/28* (2013.01); *G01D 2205/26* (2021.05)

(58) Field of Classification Search
CPC . H01F 5/00; H01F 27/24; H01F 27/28; G01R 33/02; G01R 33/028; G01P 3/42;
(Continued)

(56) References Cited

U.S. PATENT DOCUMENTS 3,820,090 A 6/1974 Wiegand
4,443,114 A 4/1984 Kumata
(Continued)

FOREIGN PATENT DOCUMENTS

DE 4018148 A1 12/1991
DE 10011448 A1 9/2000
(Continued)

OTHER PUBLICATIONS

International Search Report of PCT application No. PCT/JP2022/017528 dated Jul. 5, 2022.
(Continued)

*Primary Examiner* — Huy Q Phan
*Assistant Examiner* — David B Frederiksen
(74) *Attorney, Agent, or Firm* — RIMON P.C.

(57) ABSTRACT

Provided are a power generation element, an encoder, a method of manufacturing a magnetic member, and a signal acquisition method capable of reducing variations in generated power. Power generation element includes: magnetic member that produces a large Barkhausen effect by a change in an external magnetic field; and coil wound around magnetic member. Magnetic member includes first magnetic sensing part and second magnetic sensing part having softer magnetism than first magnetic sensing part. First magnetic sensing part is magnetized in a winding axis direction of
(Continued)

coil, and a magnetization direction does not change due to a change in a direction of the external magnetic field.

10 Claims, 8 Drawing Sheets

(58) Field of Classification Search
CPC .... G01P 3/44; G01P 3/48; G01P 3/481; G01P 3/4815; G01D 5/12; G01D 5/244; G01D 5/245
See application file for complete search history.

(56) References Cited

U.S. PATENT DOCUMENTS

| | | | | | |
|---|---|---|---|---|---|
| 5,128,614 | A | | 7/1992 | Schewe | |
| 5,166,613 | A | * | 11/1992 | Perry | G01L 1/125 73/779 |
| 2011/0192087 | A1 | * | 8/2011 | Tategami | H03K 3/45 324/207.25 |
| 2015/0015245 | A1 | * | 1/2015 | Inoue | G01D 5/12 324/207.13 |
| 2015/0338245 | A1 | * | 11/2015 | Tatei | G01D 5/244 324/207.17 |
| 2017/0115135 | A1 | * | 4/2017 | Kasuga | G01D 5/245 |
| 2020/0141764 | A1 | * | 5/2020 | Wang | G01R 33/0011 |

FOREIGN PATENT DOCUMENTS

| | | | | |
|---|---|---|---|---|
| EP | 286881 | | | 10/1988 |
| JP | 47-028850 | A | | 11/1972 |
| JP | 54-089299 | A | | 7/1979 |
| JP | 54-116974 | A | | 9/1979 |
| JP | 58-018176 | A | | 2/1983 |
| JP | 3-219410 | A | | 9/1991 |
| JP | 4-080129 | U | | 7/1992 |
| JP | 2517893 | Y2 | | 11/1996 |
| JP | 2000-030939 | | | 1/2000 |
| JP | 2000-287470 | | | 10/2000 |
| JP | 2000287470 | A | * | 10/2000 |
| JP | 2001-221839 | A | | 8/2001 |
| JP | 2004-206378 | | | 7/2004 |
| JP | 2004206378 | A | * | 7/2004 |
| JP | 2006-073974 | | | 3/2006 |
| JP | 2006073974 | A | * | 3/2006 |
| JP | 2006-114857 | | | 4/2006 |
| JP | 2006114857 | A | * | 4/2006 |
| JP | 2012-162383 | | | 8/2012 |
| JP | 2012-198067 | | | 10/2012 |
| JP | 2014-171044 | A | | 9/2014 |
| JP | 2016-504906 | | | 2/2016 |
| JP | 2016-144335 | | | 8/2016 |
| JP | 2019-132698 | | | 8/2019 |
| JP | 2021-021705 | A | | 2/2021 |
| WO | 2014/105656 | | | 7/2014 |

OTHER PUBLICATIONS

Takemura, Yasushi [et al.]: Control of demagnetizing field and magnetostatic coupling in FeCoV wires for zero-speed sensor. In: IEEE Transactions on magnetics, vol. 42, 2006, No. 10, S. 3300-3302. ISSN 0018-9464. https://doi.org/10.1109/TMAG.2006.879751, [retrieved on Jul. 16, 2026].

* cited by examiner

POWER GENERATION ELEMENT, ENCODER, METHOD OF MANUFACTURING MAGNETIC MEMBER, AND SIGNAL ACQUISITION METHOD

TECHNICAL FIELD

The present disclosure relates to a power generation element, an encoder, a method of manufacturing a magnetic member, and a signal acquisition method, and more particularly, to a power generation element, an encoder, a method of manufacturing a magnetic member, and a signal acquisition method using the large Barkhausen effect.

BACKGROUND ART

Conventionally, in an encoder for detecting rotation or the like of a motor, there is known an encoder that uses a power generation element utilizing the large Barkhausen effect in order to detect rotation without using a battery (for example, PTL 1). Such a power generation element has, for example, a configuration in which a coil is wound around a magnetic member that produces the large Barkhausen effect. In a magnetic member that produces the large Barkhausen effect, a magnetic flux density rapidly changes due to a change in an external magnetic field, and thus electric power is generated in the coil wound around the magnetic member due to the rapid change in the magnetic flux density. The encoder detects rotation or the like of the motor by using an electric signal generated by such electric power.

CITATION LIST

Patent Literature

PTL 1: Unexamined Japanese Patent Publication No. 2012-198067
PTL 2: Unexamined Japanese Patent Publication No. 2019-132698

SUMMARY OF THE INVENTION

In the encoder described above, in a case where the variation in the electric power generated by the power generation element is large, the rotation of the motor or the like may not be accurately detected.

The present disclosure has been made to solve such a problem, and an object of the present disclosure is to provide a power generation element, an encoder, a method of manufacturing a magnetic member, and a signal acquisition method capable of reducing variations in generated power.

In order to achieve the above object, a power generation element according to an aspect of the present disclosure includes: a magnetic member that produces a large Barkhausen effect by a change in an external magnetic field; and a coil wound around the magnetic member. The magnetic member includes a first magnetic sensing part and a second magnetic sensing part having softer magnetism than the first magnetic sensing part. The first magnetic sensing part is magnetized in a winding axis direction of the coil, and has a magnetization direction that does not change due to a change in a direction of the external magnetic field.

Furthermore, a power generation element according to another aspect of the present disclosure includes: a magnetic member that produces a large Barkhausen effect by a change in an external magnetic field; and a coil wound around the magnetic member. The magnetic member has a structure in which three or more magnetic sensitive layers are stacked. Each of the three or more magnetic sensitive layers has a coercive force that increases in order of alignment in a stacking direction.

Furthermore, a power generation element according to another aspect of the present disclosure includes: a magnetic member that produces a large Barkhausen effect by a change in an external magnetic field; and a coil wound around the magnetic member. The magnetic member includes a first magnetic sensing part extending in a winding axis direction of the coil, and a second magnetic sensing part having softer magnetism than the first magnetic sensing part and aligned with the first magnetic sensing part in a direction intersecting the winding axis direction of the coil. The first magnetic sensing part has a larger cross-sectional area when cut in a direction orthogonal to the winding axis direction of the coil from both ends toward a center in the winding axis direction of the coil.

Furthermore, a power generation element according to another aspect of the present disclosure includes: a magnetic member that produces a large Barkhausen effect by a change in an external magnetic field; and a coil wound around the magnetic member. The magnetic member includes: a first magnetic sensing part having a wire shape or a film shape; a non-magnetic part that covers the first magnetic sensing part from a direction intersecting a winding axis direction of the coil and is not magnetized by the external magnetic field; and a second magnetic sensing part that covers the non-magnetic part from a side opposite to a side of the first magnetic sensing part in the non-magnetic part and has magnetic characteristics different from those of the first magnetic sensing part.

Furthermore, an encoder according to another aspect of the present disclosure includes: a magnet that rotates together with a rotating shaft; and the power generation element according to any one of the above aspects that generates an electric signal by a change in a magnetic field formed by the magnet due to rotation of the magnet.

Furthermore, a method of manufacturing a magnetic member according to another aspect of the present disclosure is a method of manufacturing a magnetic member that is used in a power generation element and produces a large Barkhausen effect, the method including: stacking a plurality of thin films each including a same magnetic material by sequentially forming the thin films while raising or lowering a temperature for each formation of each of the thin films; and cooling the plurality of stacked thin films.

Furthermore, a method of manufacturing a magnetic member according to another aspect of the present disclosure is a method of manufacturing a magnetic member that is used in a power generation element and produces a large Barkhausen effect, the method including: preparing a magnetic body having a wire shape or a film shape; and doping a surface of the magnetic body with an element that enhances a coercive force of the magnetic body.

Furthermore, a signal acquisition method according to another aspect of the present disclosure is a signal acquisition method of acquiring an electric signal generated by a power generation element including a magnetic member that produces a large Barkhausen effect by a change in an external magnetic field and a coil wound around the magnetic member, the signal acquisition method including: acquiring the electric signal generated by the power generation element by repeatedly changing the external magnetic field applied to the power generation element; and demagnetizing the magnetic member during or before acquisition of the electric signal.

According to the present disclosure, variations in generated power can be reduced.

DESCRIPTION OF EMBODIMENT

Background to Obtain an Aspect of the Present Disclosure

As a magnetic member that produces the large Barkhausen effect described above, for example, a composite magnetic wire having different magnetic characteristics between a central part and an outer peripheral part in a radial direction, such as a Wiegand wire, is used. The Wiegand wire is generally manufactured by applying different stresses to the central part and the outer peripheral part by twisting a wire-shaped magnetic material. As a result of applying different stresses in this manner, residual stresses are different between the central part and the outer peripheral part, and thus the outer peripheral part and the central part have different magnetic characteristics. In the Wiegand wire, one of the central part and the outer peripheral part is soft magnetic and the other is hard magnetic.

Figure 1:
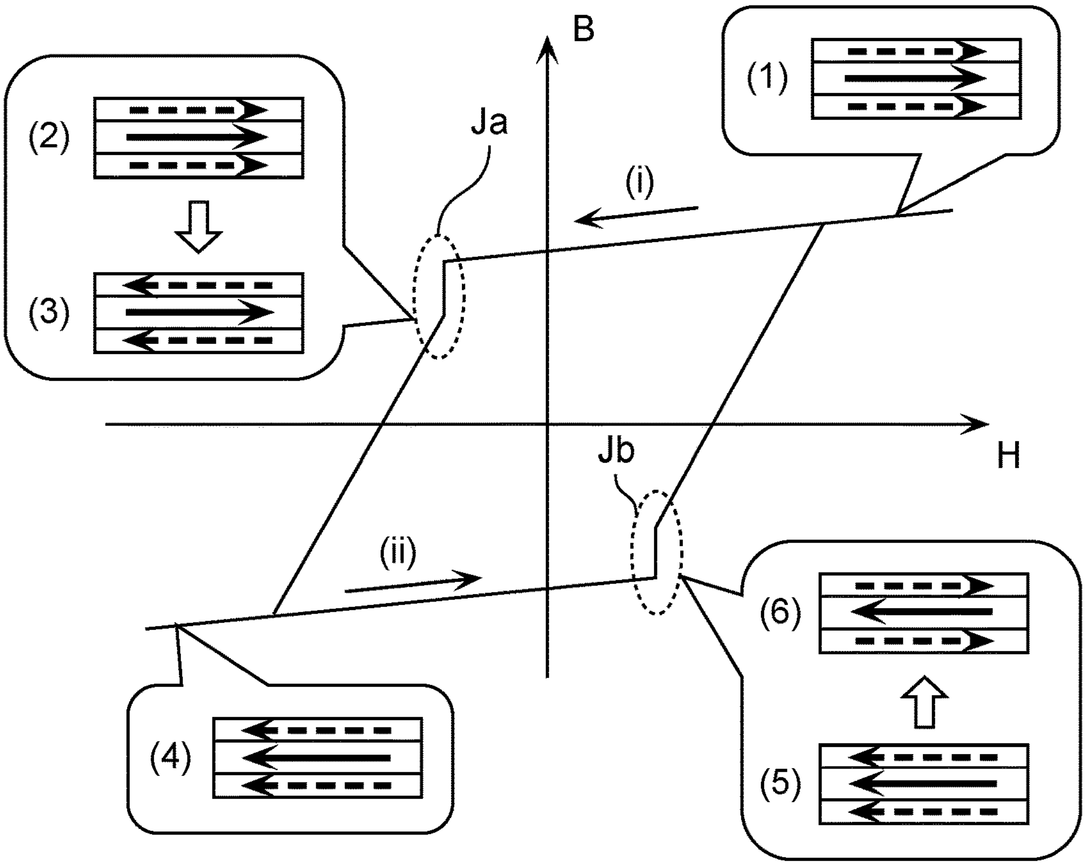
FIG. 1 is a diagram illustrating an example of a schematic BH curve of a magnetic member that produces the large Barkhausen effect.

Here, the large Barkhausen effect will be described. FIG. 1 is a diagram illustrating an example of a schematic BH curve of a magnetic member that produces the large Barkhausen effect. FIG. 1 illustrates an example in which a composite magnetic wire whose outer peripheral part is softer magnetic than a central part is used as a magnetic member. Furthermore, FIG. 1 is a diagram in a case where a direction of the applied magnetic field changes in a longitudinal direction of the wire. Furthermore, (1) to (6) of FIG. 1 schematically illustrate a magnetic member in which a direction of magnetization is indicated by an arrow. A broken line arrow indicates the magnetization direction of the outer peripheral part that is soft magnetic, and a solid line arrow indicates the magnetization direction of the central part that is hard magnetic. Note that, in FIG. 1, the arrow indicating the direction of magnetization indicates only the direction of magnetization, and the direction of magnetization is indicated by an arrow having the same magnitude regardless of the magnitude of magnetization.

When a magnetic field of a certain magnitude or more is applied to the magnetic member along the longitudinal direction of the magnetic member, the central part and the outer peripheral part of the magnetic member are magnetized in the same direction as illustrated in (1) of FIG. 1. Even if the direction of the magnetic field changes as in (i) of FIG. 1, the magnetization direction of the soft magnetic outer peripheral part does not change due to the influence of the hard magnetic center part until the magnetic field changes to some extent. As illustrated in (2) and (3) of FIG. 1, the magnetization direction of the soft magnetic outer peripheral part is reversed at once at a part surrounded by broken line Ja where the change in the magnetic field exceeds a threshold value. This phenomenon is also called a large Barkhausen jump. As a result, a magnetic flux density of the magnetic member rapidly changes, and electric power (power generation pulse) is generated in a coil wound around the magnetic member. When the magnetic field is further changed, as illustrated in (4) of FIG. 1, the magnetization direction of the central part is also reversed, and the magnetic member is magnetized in a direction opposite to (1) of FIG. 1. Also in this case, the direction of the magnetic field is changed as in (ii) of FIG. 1, and the magnetization direction of the outer peripheral part is reversed at once at a part surrounded by broken line Jb in which the change of the magnetic field exceeds a threshold as illustrated in (5) and (6) of FIG. 1. As a result, the magnetic flux density of the magnetic member rapidly changes, and electric power (power generation pulse) is generated again in the coil wound around the magnetic member. By detecting such a power generation pulse, the power generation element can be used for the encoder. In the case of the example illustrated in FIG. 1, since the direction of the magnetic field is reversed twice by a change in the direction of the magnetic field of one reciprocation, two power generation pulses are generated.

In the power generation element using such a magnetic member, in a case where the power generation pulse is repeatedly detected, the generated power in the power generation pulse may vary. For example, in a case where 5000 generation pulses are detected, a generation pulse of generated power having a difference of 10 times (so-called 10σ) or more of a standard deviation from an average value of the generated power may be detected.

For example, PTL 2 discloses a technique capable of reducing variations in power generated by using a magnetic member manufactured by twisting a wire-shaped magnetic material under a predetermined condition for a power generation element. However, in the technique disclosed in PTL 2, there is a possibility that the variations in generated power cannot be sufficiently reduced depending on the accuracy of the control of the twisting condition. Furthermore, the technique disclosed in PTL 2 can reduce only variations in generated power due to variations in conditions for twisting the magnetic material. For example, the inventors have found that, due to the influence of an external magnetic field, a magnetic flux bias occurs in the hard magnetic part of the magnetic member, and thus, there is a possibility that the generated power varies.

Therefore, in view of the above problems, the present disclosure provides a power generation element, an encoder, a method of manufacturing a magnetic member, and a signal acquisition method capable of reducing variations in generated power.

Hereinafter, exemplary embodiments of the present disclosure will be described with reference to the drawings. Note that, each of the exemplary embodiments described below illustrates one specific example of the present disclosure. Consequently, numerical values, shapes, materials, constituent elements, layout positions and connection modes of constituent elements, and the like illustrated in the following exemplary embodiments are merely one example, and are not intended to limit the present disclosure. Therefore, among the constituent elements in the following exemplary embodiments, constituent elements not recited in the independent claims of the present disclosure are described as optional constituent elements.

Note that each of the drawings is a schematic diagram and not necessarily illustrated exactly. Thus, scales and the like are not necessarily matched in the respective drawings. Furthermore, in the drawings, substantially the same components are denoted by the same reference marks, and redundant descriptions thereof will be omitted or simplified.

Furthermore, in the present specification, a term indicating a relationship between elements such as parallel, a term indicating a shape of an element such as a rectangle, and a numerical range are not expressions representing only a strict meaning, but are expressions meaning to include a substantially equivalent range, for example, a difference of about several %.

First Exemplary Embodiment

Encoder 1 and power generation element 100 according to a first exemplary embodiment will be described.

Figure 2:
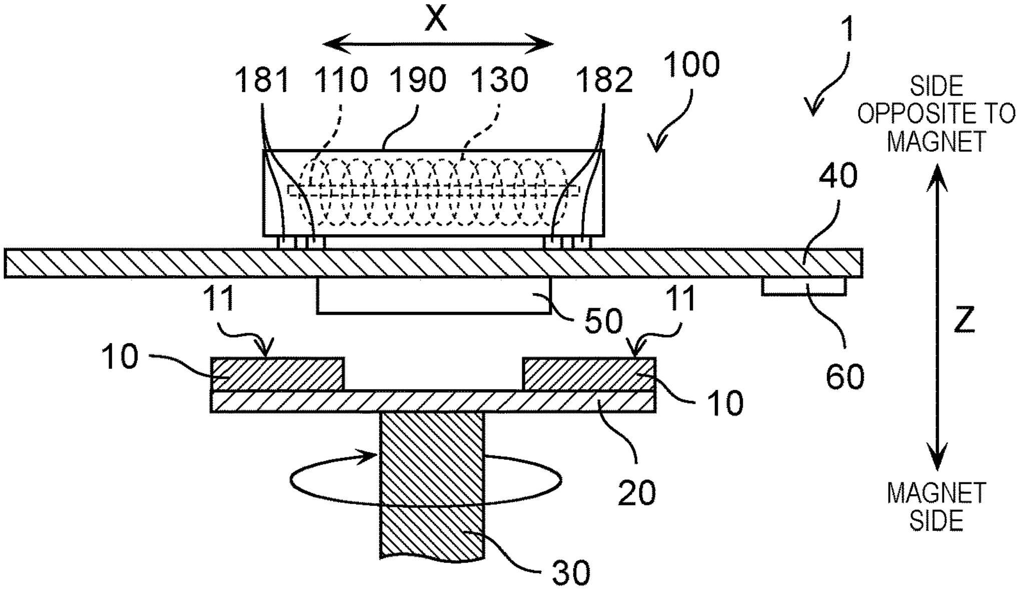
FIG. 2 is a cross-sectional view illustrating a schematic configuration of an encoder according to a first exemplary embodiment.
Figure 3:
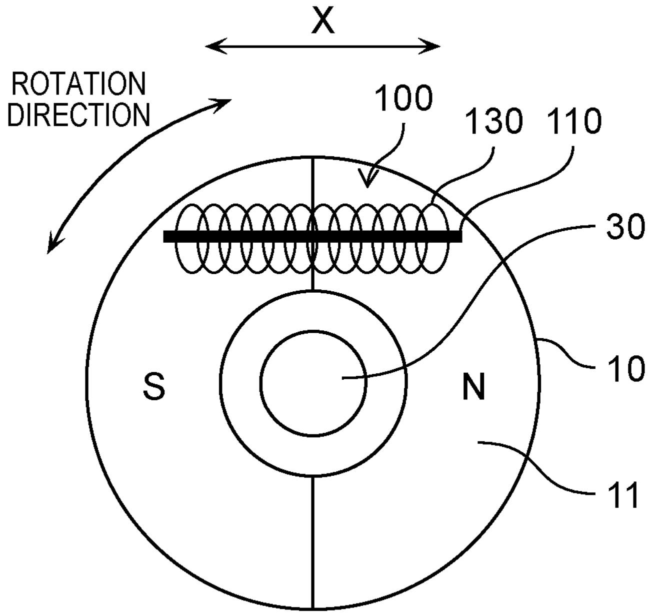
FIG. 3 is a top view of a magnet in the encoder according to the first exemplary embodiment.

FIG. 2 is a cross-sectional view illustrating a schematic configuration of encoder 1 according to the present exemplary embodiment. FIG. 3 is a top view of magnet 10 in encoder 1 according to the present exemplary embodiment. Note that, in FIG. 2, magnetic member 110 and coil 130 accommodated in housing 190 of power generation element 100 are schematically illustrated by broken lines. Furthermore, in FIG. 3, illustration of components other than magnet 10, rotating shaft 30, and magnetic member 110 and coil 130 in power generation element 100 is omitted for ease of viewing. The same applies to an encoder and a magnet illustrated below.

Encoder 1 illustrated in FIG. 2 is, for example, a rotary encoder used in combination with a motor such as a servomotor. Furthermore, encoder 1 is, for example, an absolute encoder of a power generation system. Encoder 1 detects, for example, a rotation angle, a rotation amount, a rotation speed, and the like of rotating shaft 30 of a motor and the like on the basis of an electric signal generated by power generation element 100. Encoder 1 includes magnet 10, rotating plate 20, board 40, control circuit 50, memory 60, and power generation element 100. In encoder 1, power generation element 100 generates an electric signal by a change in a magnetic field formed by magnet 10 due to the rotation of magnet 10.

Rotating plate 20 is a plate-shaped member that rotates together with rotating shaft 30 of a motor or the like. A central part of one principal surface of rotating plate 20 is attached to an end of rotating shaft 30 in an axial direction of rotating shaft 30 (a direction in which rotating shaft 30 extends). Rotating plate 20 extends in a direction orthogonal to the axial direction of rotating shaft 30. Rotating plate 20 rotates about rotating shaft 30. A rotating operation of rotating shaft 30 is synchronized with a rotating operation of a rotating device. A shape of rotating plate 20 in plan view is, for example, a circular shape. Rotating plate 20 is made of metal, resin, glass, ceramic, or the like, for example.

Magnet 10 is a magnetic field generation source that forms an external magnetic field with respect to power generation element 100. Magnet 10 is, for example, a plate-shaped magnet. Magnet 10 faces rotating plate 20 and is located on the principal surface of rotating plate 20 on a side opposite to a side of rotating shaft 30. A thickness direction of rotating plate 20 and a thickness direction of magnet 10 are the same, and are an axial direction of rotating shaft 30. Magnet 10 rotates about rotating shaft 30 together with rotating plate 20. A rotation direction of magnet 10 is, for example, both clockwise and counterclockwise, but may be only one of clockwise and counterclockwise. A plan view shape of magnet 10 is a circular shape with an opening at a center, but may be another shape such as a rectangle. Furthermore, magnet 10 may not be opened. Furthermore, magnet 10 may be a magnet of another shape such as a rod-shaped magnet as long as a magnetic field applied to power generation element 100 can be changed.

Magnet 10 has a plurality of pairs of magnetic poles magnetized in the thickness direction, and the plurality of pairs of magnetic poles are arranged in the rotation direction of magnet 10. In FIG. 3, a magnetic pole on a side of principal surface 11, which is a surface of magnet 10 on a side of power generation element 100, is illustrated. Each pair of magnetic poles is magnetized such that an N pole and an S pole are reversed with respect to a pair of magnetic poles adjacent in the rotation direction of magnet 10.

In magnet 10, a plurality of magnetic poles are arranged in the rotation direction on principal surface 11 of magnet 10 on the side of power generation element 100. The plurality of magnetic poles includes at least one N pole and at least one S pole, and the N pole and the S pole are alternately arranged along the rotation direction. In the plurality of magnetic poles of magnet 10, the number of N poles is the same as the number of S poles.

The plurality of magnetic poles are arranged such that the N pole and the S pole face each other across rotating shaft 30. That is, the N pole of the plurality of magnetic poles faces the S pole with rotating shaft 30 interposed therebetween, and the S pole of the plurality of magnetic poles faces the N pole with rotating shaft 30 interposed therebetween. In the plurality of magnetic poles, the S pole is located at a position shifted by 180 degrees from the N pole and the N pole is located at a position shifted by 180 degrees from the S pole in the rotation direction of magnet 10. When viewed from the axial direction of rotating shaft 30, the sizes of the respective magnetic poles of the plurality of magnetic poles are equal. The rotation of magnet 10 changes a magnetic field applied to power generation element 100. In the example illustrated in FIG. 3, the plurality of magnetic poles is two, and includes one N pole and one S pole. Therefore, when magnet 10 makes one rotation together with rotating shaft 30, a direction of the magnetic field applied to power generation element 100 is reversed twice (one reciprocation). The number of the plurality of magnetic poles is not particularly limited, and may be four or six or more. When magnet 10 makes one rotation, the direction of the magnetic field applied to power generation element 100 is reversed by the number of magnetic poles. Therefore, by increasing the number of the plurality of magnetic poles, the number of reversals of the direction of the magnetic field when magnet 10 makes one rotation can be increased, and as a result, the number of times of generation of the power generation pulse by power generation element 100 can be increased.

Board 40 is positioned on a side of magnet 10 of rotating plate 20 so as to face rotating plate 20 and magnet 10 with a space therebetween. That is, rotating shaft 30, rotating plate 20, magnet 10, and board 40 are aligned in this order along the axial direction of rotating shaft 30. Board 40 does not rotate together with magnet 10 and rotating plate 20. Board 40 has a plate shape whose thickness direction is the axial direction of rotating shaft 30. A plan view shape of board 40 is, for example, a circular shape. For example, when viewed from the axial direction of rotating shaft 30, centers of rotating shaft 30, rotating plate 20, magnet 10, and board 40 coincide with each other.

Board 40 is, for example, a wiring board on which electronic components such as power generation element 100, control circuit 50, and memory 60 are mounted. In the example illustrated in FIG. 2, control circuit 50 and memory 60 are mounted on the principal surface of board 40 on a side of magnet 10, and power generation element 100 is mounted on the principal surface of board 40 on a side opposite to magnet 10. Board 40 is fixed to, for example, a case (not illustrated) constituting a part of encoder 1, the motor, or the like.

Power generation element 100 is located on the principal surface of board 40 on the side opposite to the side of magnet 10. Therefore, a side of board 40 of power generation element 100 is the side of magnet 10. Power generation element 100 is aligned with magnet 10 and rotating plate 20 along the axial direction of rotating shaft 30. Hereinafter, a direction indicated by arrow Z in which magnet 10, rotating plate 20, and power generation element 100 are aligned may be referred to as an “alignment direction”. The alignment direction is also a normal direction of principal surface 11 of magnet 10. Power generation element 100 does not rotate together with magnet 10 and rotating plate 20. Power generation element 100 is provided such that at least a part thereof faces magnet 10 and rotating plate 20 in the axial direction of rotating shaft 30. Furthermore, power generation element 100 extends along the principal surface of board 40 so as to extend in a direction intersecting (specifically, orthogonal to) a radial direction of magnet 10. Power generation element 100 generates power by a change in the magnetic field formed by magnet 10 due to the rotation of magnet 10, and generates an electric signal. A winding axis direction of coil 130 of power generation element 100 (a longitudinal direction of magnetic member 110) is a direction in which power generation element 100 extends. The winding axis direction of coil 130 is a direction indicated by arrow X in the drawing. Hereinafter, the winding axis direction of coil 130 indicated by arrow X in the drawing may be simply referred to as a “winding axis direction”.

Figure 4:
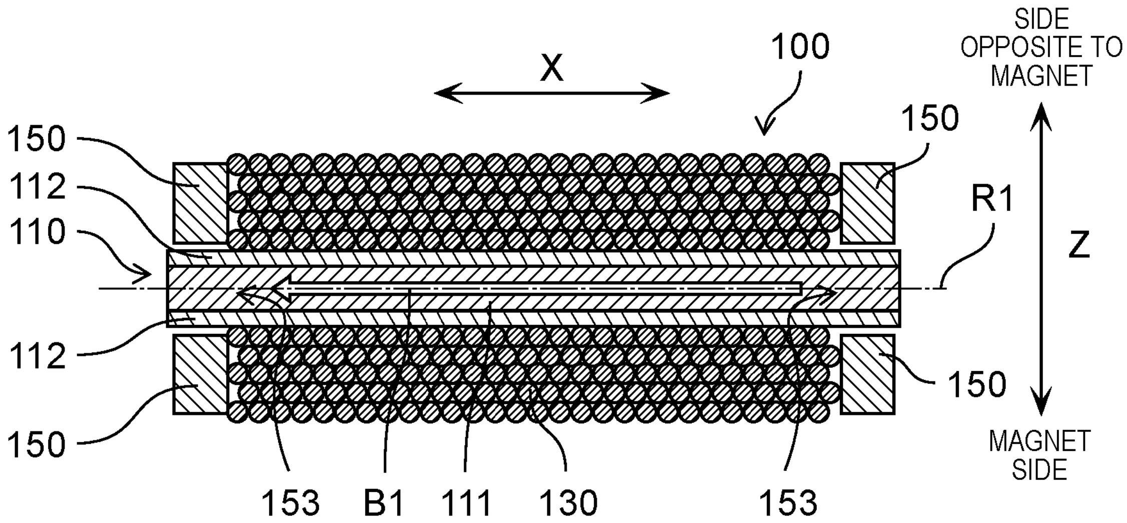
FIG. 4 is a cross-sectional view illustrating a schematic configuration of a power generation element according to the first exemplary embodiment.

Power generation element 100 includes, for example, magnetic member 110, coil 130, ferrite member 150 (not illustrated in FIGS. 2 and 3) illustrated in the cross-sectional view of FIG. 4, terminals 181, 182, and housing 190.

Although details of magnetic member 110, coil 130, and ferrite member 150 will be described later, magnetic member 110 is a magnetic member that produces the large Barkhausen effect, and a power generation pulse is generated in coil 130 wound around magnetic member 110. Note that an arrangement of power generation element 100 is not particularly limited as long as power generation element 100 is located in an area to which a magnetic field generated by magnet 10 is applied and is arranged to generate a power generation pulse by a change in the magnetic field due to the rotation of rotating shaft 30.

Terminals 181, 182 are members for electrically connecting power generation element 100 and board 40. Terminals 181, 182 are located at ends of power generation element 100 on the side of board 40. Magnet 10 is disposed on a side of terminals 181, 182 of power generation element 100. Terminal 181 is electrically connected to one end of a conductive wire constituting coil 130, and terminal 182 is electrically connected to the other end of the conductive wire. That is, coil 130 and board 40 are electrically connected via terminals 181, 182.

Housing 190 accommodates and supports magnetic member 110, coil 130, and ferrite member 150. Furthermore, housing 190 accommodates a part of terminals 181, 182. Housing 190 is opened to the side of magnet 10 of power generation element 100, for example. Housing 190 is fixed to board 40 by, for example, a fixing member (not illustrated) or the like.

Control circuit 50 is located on the principal surface of board 40 on the side of magnet 10. Control circuit 50 is electrically connected to power generation element 100. Control circuit 50 acquires an electric signal such as a power generation pulse generated by power generation element 100, and detects (calculates) a rotation angle, a rotation amount, a rotation speed, and the like of rotating shaft 30 of a motor and the like based on the acquired electric signal. Control circuit 50 is, for example, an integrated circuit (IC) package or the like.

Memory 60 is located on the principal surface of board 40 on the side of magnet 10. Memory 60 is connected to control circuit 50. Memory 60 is a nonvolatile memory such as a semiconductor memory that stores a result detected by control circuit 50.

Next, details of power generation element 100 according to the present exemplary embodiment will be described.

FIG. 4 is a cross-sectional view illustrating a schematic configuration of power generation element 100 according to the present exemplary embodiment. FIG. 4 illustrates a cross section taken along the alignment direction so as to pass through winding axis R1 of coil 130. Note that illustration of terminal 181, terminal 182, and housing 190 is omitted in FIG. 4 for ease of viewing. The same applies to the drawings of the power generation elements described below.

As illustrated in FIG. 4, power generation element 100 includes magnetic member 110, coil 130, and ferrite member 150.

Magnetic member 110 is a magnetic member that produces the large Barkhausen effect by a change in an external magnetic field formed by magnet 10 and the like. Magnetic member 110 includes first magnetic sensing part 111 and second magnetic sensing part 112 having magnetic characteristics different from those of first magnetic sensing part 111. In the present exemplary embodiment, second magnetic sensing part 112 has a lower coercive force than first magnetic sensing part 111 and is soft magnetic. Magnetic member 110 is, for example, an elongated member in which the winding axis direction of coil 130 is the longitudinal direction. A cross-sectional shape of magnetic member 110 cut in the radial direction is, for example, a circular shape or an elliptical shape, but may be another shape such as a rectangular shape or a polygonal shape. In the winding axis direction, a length of magnetic member 110 is longer than a length of coil 130, for example.

Magnetic member 110 is, for example, a composite magnetic wire having different magnetic characteristics between a central part and an outer peripheral part in a radial direction, such as a Wiegand wire. In the present exemplary embodiment, in magnetic member 110, for example, the central part in the radial direction is first magnetic sensing part 111 having a high coercive force, and the outer peripheral part in the radial direction is second magnetic sensing part 112 having a low coercive force. First magnetic sensing part 111 and second magnetic sensing part 112 each extend in the winding axis direction. First magnetic sensing part 111 and second magnetic sensing part 112 both have an elongated shape extending in the winding axis direction. Specifically, first magnetic sensing part 111 has a wire shape extending in the winding axis direction, and second magnetic sensing part 112 has a tubular shape extending in the winding axis direction. Second magnetic sensing part 112 covers a surface to be an outer periphery of first magnetic sensing part 111 when viewed from the winding axis direction, in other words, a surface extending along the winding axis direction. First magnetic sensing part 111 and second magnetic sensing part 112 are aligned in a direction intersecting (for example, orthogonal to) the winding axis direction. Note that magnetic member 110 is not limited to such a shape, and may be any magnetic member that produces the large Barkhausen effect by including first magnetic sensing part 111 and second magnetic sensing part 112 having different magnetic characteristics. For example, in magnetic member 110, the central part may be second magnetic sensing part 112, and the outer peripheral part may be first magnetic sensing part 111. Furthermore, magnetic member 110 may be, for example, a magnetic member having a structure in which thin films having different magnetic characteristics are stacked.

First magnetic sensing part 111 is magnetized in the winding axis direction. In FIG. 4, a magnetization direction of first magnetic sensing part 111 is schematically indicated by arrow B1. For example, when a magnetic field in which a magnetization state of first magnetic sensing part 111 is saturated is applied to magnetic member 110, first magnetic sensing part 111 is completely magnetized. The magnetization direction of first magnetic sensing part 111 does not change due to a change in the direction of the external magnetic field formed by magnet 10 or the like. Note that the direction of arrow B1 may be an opposite direction as long as it is a direction along the winding axis direction.

Coil 130 is a coil in which a conductive wire constituting coil 130 is wound around magnetic member 110. Specifically, coil 130 passes through a center of magnetic member 110 and is wound along winding axis R1 extending in the longitudinal direction of magnetic member 110. Furthermore, coil 130 is located between two ferrite members 150.

Ferrite member 150 is provided at the end of magnetic member 110 so as to be aligned with coil 130 along the winding axis direction of coil 130. In the present exemplary embodiment, two ferrite members 150 are provided at both ends of magnetic member 110, respectively. Two ferrite members 150 face each other with coil 130 interposed therebetween and have a symmetrical shape. Hereinafter, one of two ferrite members 150 will be mainly described, but the same description is applied to the other.

Ferrite member 150 is a plate-shaped member in which opening 153 is formed, and is, for example, ferrite beads made of a soft magnetic material. Ferrite member 150 is provided for magnetism collection of magnetic flux from magnet 10, stabilization of magnetic flux in magnetic member 110, and the like. Ferrite member 150 has, for example, a circular outer shape when viewed from the winding axis direction, but may have another shape such as a rectangular shape or a polygonal shape. Ferrite member 150 is, for example, softer magnetic than second magnetic sensing part 112 in magnetic member 110, that is, has a lower coercive force. The end of magnetic member 110 is located in opening 153. Opening 153 is a through hole penetrating ferrite member 150 along the winding axis direction.

Figure 5:
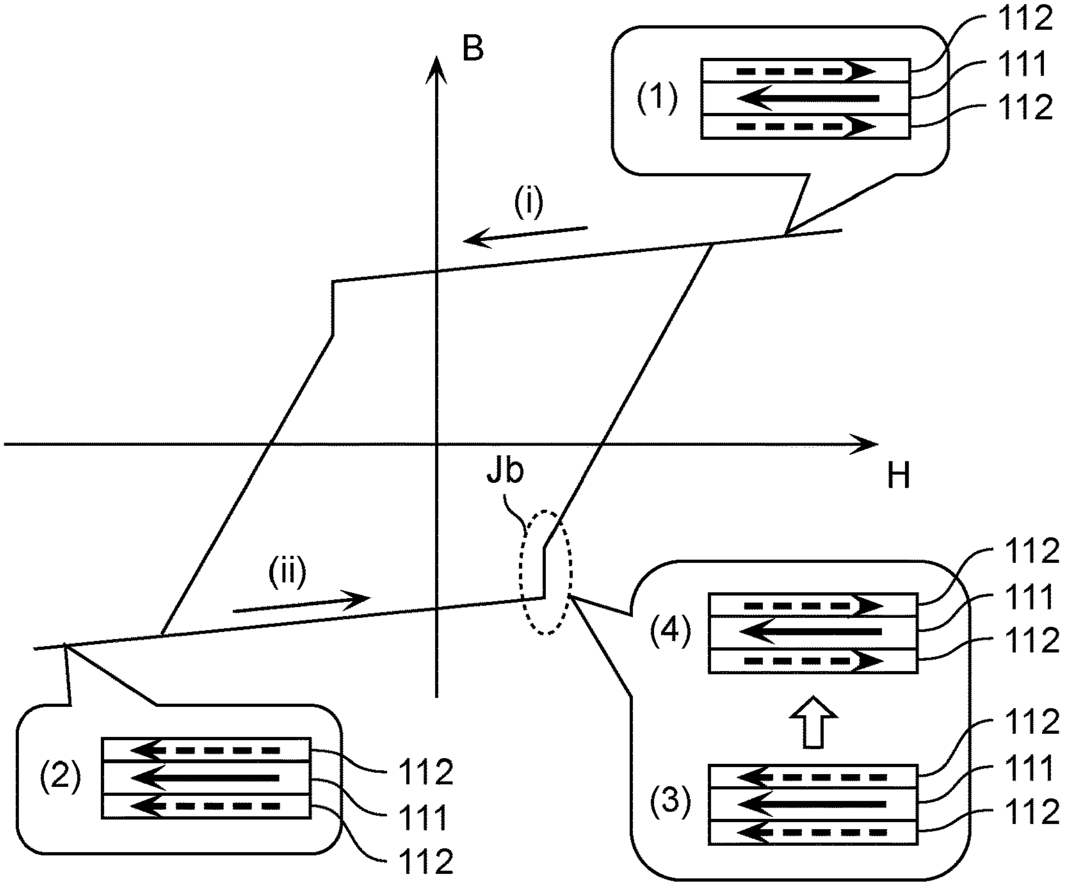
FIG. 5 is a diagram illustrating an example of a schematic BH curve of a magnetic member according to the first exemplary embodiment.

Next, the large Barkhausen effect in magnetic member 110 will be described. FIG. 5 is a diagram illustrating an example of a schematic BH curve of magnetic member 110. In FIG. 5, as in FIG. 1, the direction of magnetization in magnetic member 110 is indicated by solid line arrows and broken line arrows. Note that, in FIG. 5, the arrow indicating the direction of magnetization indicates only the direction of magnetization, and the direction of magnetization is indicated by an arrow having the same magnitude regardless of the magnitude of magnetization.

As illustrated in (1) of FIG. 5, in magnetic member 110, even if a magnetic field in a direction opposite to the magnetization direction of first magnetic sensing part 111 is applied, the magnetization direction of first magnetic sensing part 111 does not change, and thus first magnetic sensing part 111 and second magnetic sensing part 112 are magnetized in opposite directions. Therefore, when the direction of the magnetic field changes as illustrated in (i) of FIG. 5, as illustrated in (2) of FIG. 5, the magnetization direction of second magnetic sensing part 112 is reversed so as to be the same as the magnetization direction of first magnetic sensing part 111. In this case, rapid reversal of the magnetization direction of second magnetic sensing part 112 as in a part surrounded by broken line Ja in FIG. 1 is unlikely to occur, so that a large Barkhausen jump does not occur.

On the other hand, when the direction of the magnetic field changes from a state illustrated in (2) of FIG. 5 as in (ii) of FIG. 5, the magnetization direction of second magnetic sensing part 112 does not change due to the influence of first magnetic sensing part 111 until the change of the magnetic field to some extent. As illustrated in (3) and (4) of FIG. 5, the magnetization direction of second magnetic sensing part 112 is reversed at once at a part surrounded by broken line Jb where the change in the magnetic field exceeds a threshold value. As a result, the magnetic flux density of magnetic member 110 rapidly changes, and electric power (power generation pulse) is generated in coil 130 wound around magnetic member 110.

In a magnetic member such as a conventional Wiegand wire, as illustrated in FIG. 1, a large Barkhausen jump occurs at two locations surrounded by broken line Ja and broken line Jb by a change in the direction of the magnetic field of one reciprocation, and two power generation pulses are generated in the coil. Therefore, since the two power generation pulses are caused by the change in the magnetic field in the opposite direction, when the magnetization state of the magnetic member is biased, a power generation amount of the two power generation pulses also varies. For example, when the magnitude of the magnetization of the hard magnetic part in (2) of FIG. 1 is different from the magnitude of the magnetization of the hard magnetic part in (5) of FIG. 1 due to the influence of the external magnetic field, a change amount of the magnetic flux density in the large Barkhausen jump is different between the part surrounded by broken line Ja and the part surrounded by broken line Jb.

On the other hand, in magnetic member 110, since first magnetic sensing part 111 is completely magnetized and the magnetization direction does not change, a large Barkhausen jump occurs at one part surrounded by broken line Jb by a change in the direction of the magnetic field of one reciprocation, and one power generation pulse is generated in coil 130. Therefore, unlike the conventional magnetic member, there is no variation between two power generation pulses caused by a change in the direction of the magnetic field of one reciprocation. Therefore, the variations in the generated power of power generation element 100 can be reduced. Furthermore, in a case where first magnetic sensing part 111 is not completely magnetized, there is a possibility that a region that is hardly magnetized by the external magnetic field formed by magnet 10 or the like exists in first magnetic sensing part 111. However, since first magnetic sensing part 111 is completely magnetized, the region is also magnetized, and the change in the magnetic flux density of magnetic member 110 in the large Barkhausen jump can be increased. Therefore, power generation element 100 can generate a more stable power generation pulse.

First Modification

Next, a first modification of the first exemplary embodiment will be described. In the following description of the present modification, differences from the first exemplary embodiment will be mainly described, and description of common points will be omitted or simplified.

Figure 6:
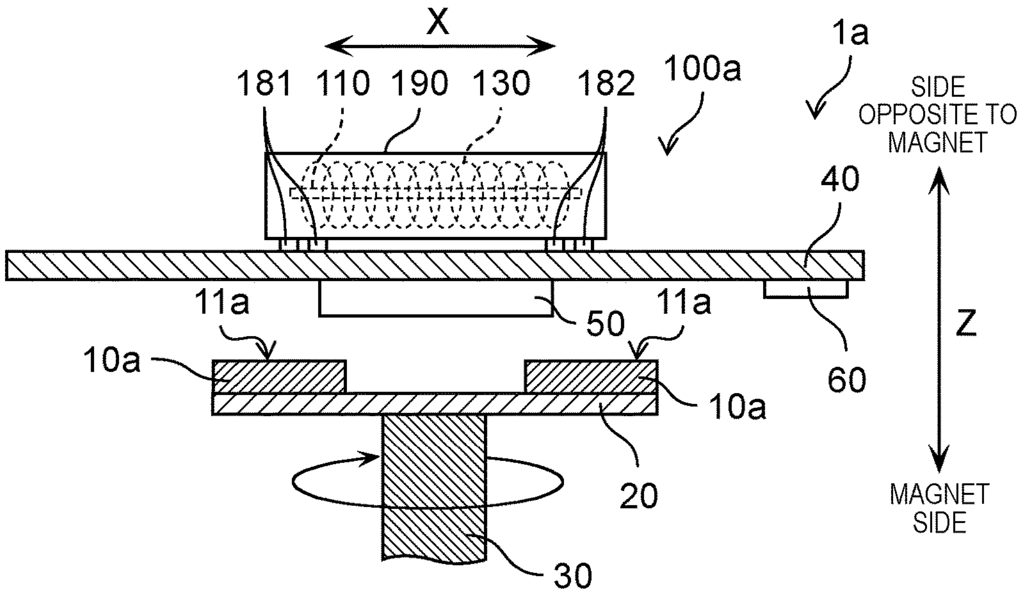
FIG. 6 is a cross-sectional view illustrating a schematic configuration of an encoder according to a first modification of the first exemplary embodiment.
Figure 7:
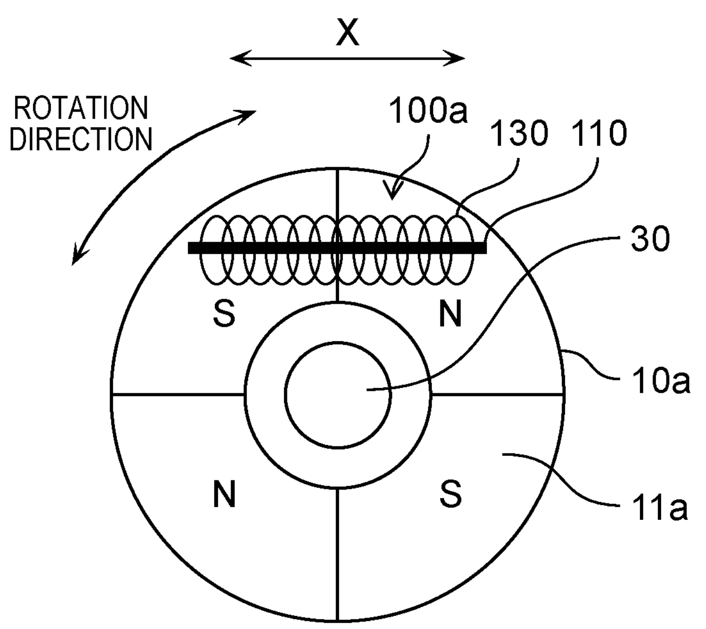
FIG. 7 is a top view of a magnet in the encoder according to the first modification of the first exemplary embodiment.

FIG. 6 is a cross-sectional view illustrating a schematic configuration of encoder 1*a* according to the present modification. FIG. 7 is a top view of magnet 10*a* in encoder 1*a* according to the present modification.

As illustrated in FIGS. 6 and 7, encoder 1*a* is different from encoder 1 in that magnet 10*a* is provided instead of magnet 10, and power generation element 100*a* is provided instead of power generation element 100. Similarly to power generation element 100, power generation element 100*a* is a power generation element using magnetic member 110, and generates one power generating pulse by changing the direction of the magnetic field of one reciprocation. Although details will be described later, in encoder 1*a*, the number of magnetic poles in magnet 10*a* is increased in order to match the number of times of generation of the power generation pulse with the case of using the power generation element in which two power generation pulses are generated by changing the direction of the magnetic field of one reciprocation.

Magnet 10*a* has the same configuration as magnet 10 except that the number of the plurality of magnetic poles arranged in the rotation direction on principal surface 11*a* is different from the number of the plurality of magnetic poles arranged in the rotation direction on principal surface 11 of magnet 10.

In magnet 10*a*, the number of the plurality of magnetic poles is four. The plurality of magnetic poles includes two N poles and two S poles, and the N poles and the S poles are alternately arranged along the rotation direction. Therefore, when magnet 10*a* makes one rotation together with rotating shaft 30, a direction of the magnetic field applied to power generation element 100*a* is reversed four times (two reciprocations). Therefore, even in a case where the number of times of generation of the power generation pulse is reduced to one by a change in the direction of the magnetic field of one reciprocation, two power generation pulses are generated by one rotation of magnet 10*a*. When viewed from the axial direction of rotating shaft 30, the sizes of the respective magnetic poles of the plurality of magnetic poles are equal.

Figure 8:
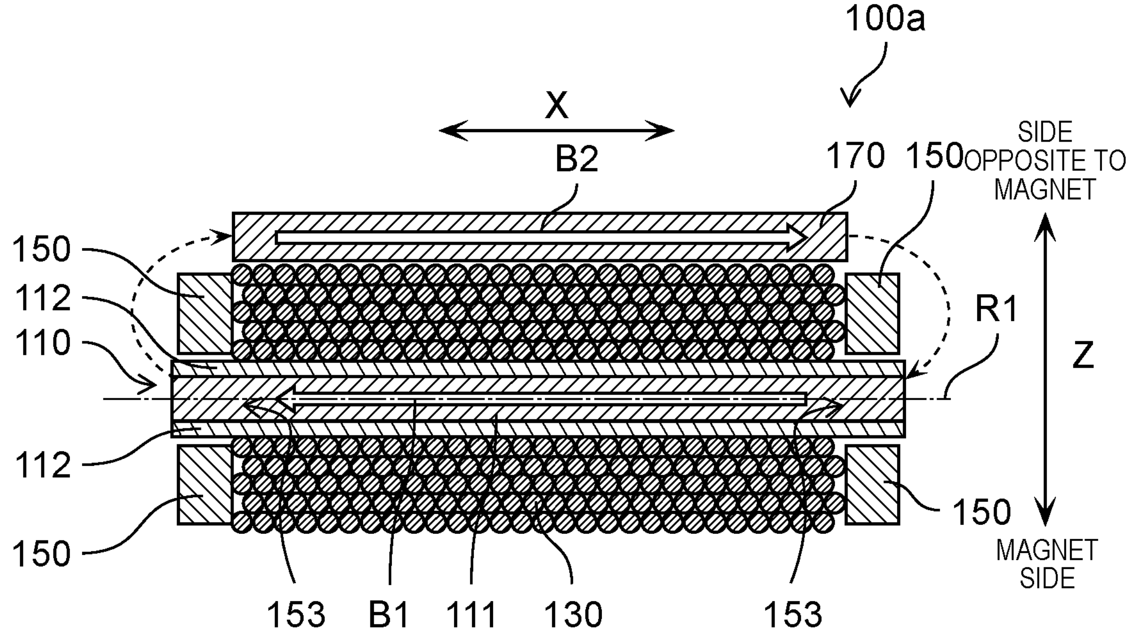
FIG. 8 is a cross-sectional view illustrating a schematic configuration of a power generation element according to the first modification of the first exemplary embodiment.

FIG. 8 is a cross-sectional view illustrating a schematic configuration of power generation element 100*a* according to the present modification. Power generation element 100*a* further includes bias magnet 170 in addition to the configuration of power generation element 100.

Bias magnet 170 is a magnet that applies, to magnetic member 110, a magnetic field in the same direction as the magnetization direction of first magnetic sensing part 111. Bias magnet 170 is disposed on a side of magnetic member 110 and coil 130 opposite to the side of magnet 10 so as to face magnetic member 110 and coil 130. Magnetic member 110, coil 130, and bias magnet 170 are aligned along an alignment direction indicated by arrow Z.

Bias magnet 170 is magnetized, for example, in the winding axis direction. In FIG. 8, the magnetization direction of bias magnet 170 is schematically indicated by arrow B2. Furthermore, a magnetic flux line generated by bias magnet 170 is indicated by broken line arrows. The magnetization direction of bias magnet 170 is opposite to the magnetization direction of first magnetic sensing part 111. Since the magnetic flux around the outside of bias magnet 170 is in a direction opposite to the magnetization direction of bias magnet 170, a magnetic field in the same direction as the magnetization direction of first magnetic sensing part 111 is applied to magnetic member 110.

Figure 9A:
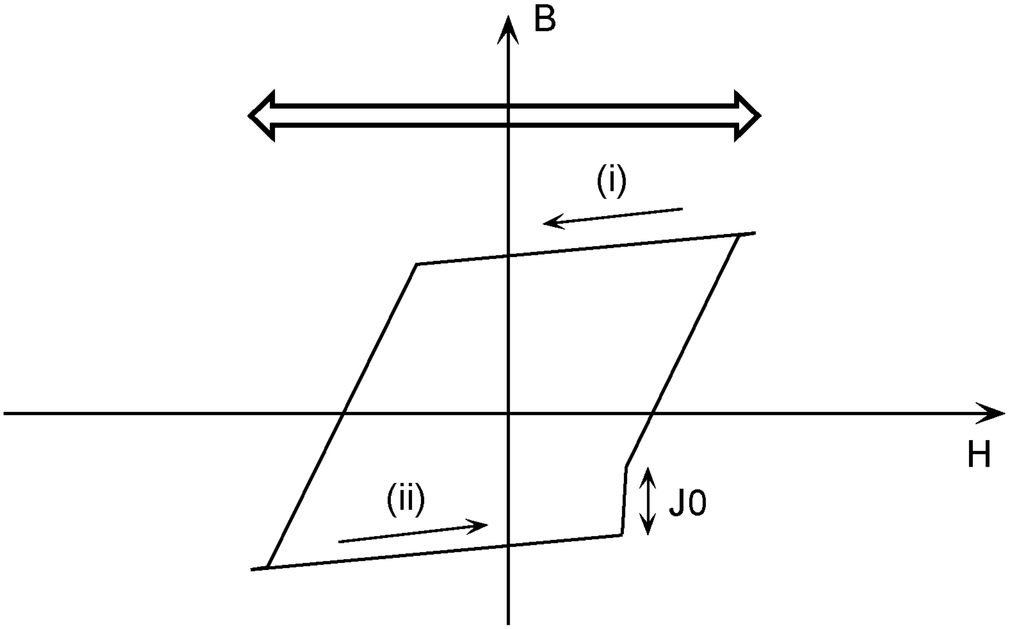
FIG. 9A is a diagram for explaining a change in magnetization behavior of a magnetic member in a case where a power generation element does not include a bias magnet.
Figure 9B:
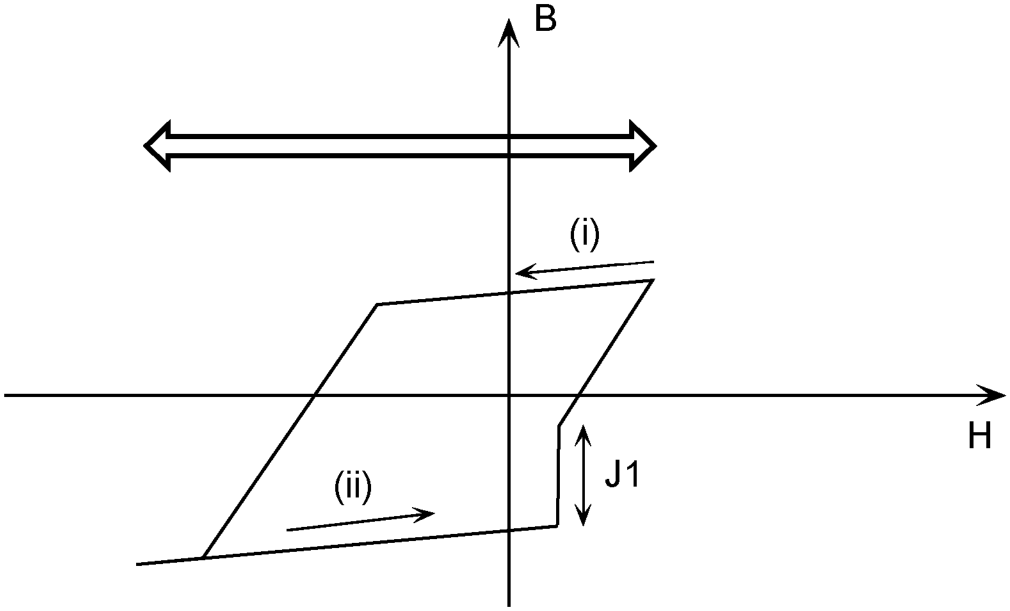
FIG. 9B is a diagram for explaining a change in magnetization behavior of a magnetic member by a bias magnet in a case where the power generation element includes the bias magnet.

Next, a change in the magnetization behavior of magnetic member 110 by bias magnet 170 will be described. FIGS. 9A and 9B are diagrams for explaining a change in the magnetization behavior of magnetic member 110 by bias magnet 170. FIG. 9A illustrates an example of a schematic BH curve of magnetic member 110 in a case where power generation element 100*a* does not include bias magnet 170, and FIG. 9B illustrates an example of a schematic BH curve of magnetic member 110 in power generation element 100*a* including bias magnet 170.

As illustrated in FIG. 9A, similarly to the case described with reference to FIG. 5, in magnetic member 110, one large Barkhausen jump occurs with a change in the direction of the magnetic field of one reciprocation. Furthermore, in encoder 1*a*, the number of the plurality of magnetic poles in magnet 10*a* is four, and the number of the plurality of magnetic poles is larger than that of magnet 10. In a case where magnet 10 and magnet 10*a* have the same size, since the number of the plurality of magnetic poles is larger in magnet 10*a*, the size of each magnetic pole becomes smaller, and the magnitude of the magnetic field applied to magnetic member 110 becomes smaller. Therefore, a change range of the magnetic field in encoder 1_a_ indicated by a white arrow in FIG. 9A is smaller than a change range of the magnetic field in encoder 1 described in FIG. 5. As a result, even when a magnetic field is applied to magnetic member 110, the magnetic flux of magnetic member 110 is less likely to increase, and the change in the magnetic flux density of magnetic member 110 at large Barkhausen jump J0 is likely to decrease. Therefore, a power generation amount of coil 130 decreases.

On the other hand, since power generation element 100_a_ includes the bias magnet, as illustrated in FIG. 9B, a change range of the magnetic field in encoder 1_a_ indicated by a white arrow is shifted from the change range of the magnetic field illustrated in FIG. 9B to an application direction (negative direction in FIG. 9B) of the magnetic field to magnetic member 110 by bias magnet 170. Therefore, it is possible to apply a sufficiently large magnetic field to magnetic member 110 before large Barkhausen jump J1 occurs when the magnetic field changes in the direction of (ii). As a result, the change in the magnetic flux density in large Barkhausen jump J1 is larger than the change in the magnetic flux density in large Barkhausen jump J0. Therefore, an amount of electric power generated in coil 130 is larger than that in a case where bias magnet 170 is not provided. Furthermore, in a case where the magnetic field changes in the direction of (i), a large Barkhausen jump does not occur. Therefore, even if the magnitude of the magnetic field applied to magnetic member 110 is small, there is no influence on the power generation pulse. Therefore, power generation element 100_a_ can generate a more stable power generation pulse. Such power generation element 100_a_ is particularly useful when used in encoder 1_a_ including magnet 10_a_ having a large number of magnetic poles. Note that power generation element 100_a_ may be used instead of power generation element 100 of encoder 1.

Second Exemplary Embodiment

Next, a second exemplary embodiment will be described. In the following description of the present exemplary embodiment, differences from the first exemplary embodiment will be mainly described, and description of common points will be omitted or simplified.

Figure 10:
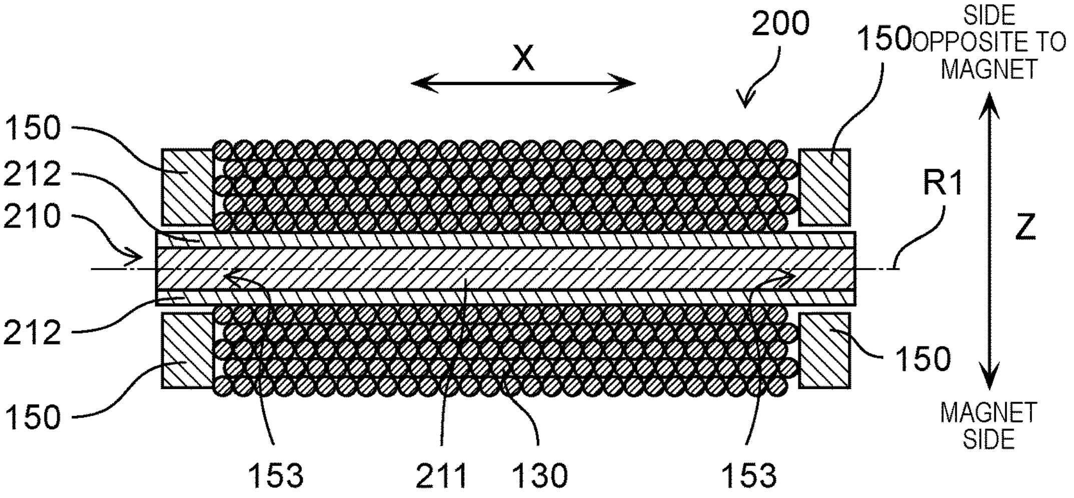
FIG. 10 is a cross-sectional view illustrating a schematic configuration of a power generation element according to a second exemplary embodiment.

FIG. 10 is a cross-sectional view illustrating a schematic configuration of power generation element 200 according to the present exemplary embodiment. An encoder according to the present exemplary embodiment includes, for example, power generation element 200 instead of power generation element 100 of encoder 1 according to the first exemplary embodiment.

As illustrated in FIG. 10, power generation element 200 is different from power generation element 100 in that magnetic member 210 is provided instead of magnetic member 110.

Magnetic member 210 includes first magnetic sensing part 211 and second magnetic sensing part 212 having magnetic characteristics different from those of first magnetic sensing part 211. In the present exemplary embodiment, second magnetic sensing part 212 has a higher coercive force and is hard magnetic than first magnetic sensing part 211. Magnetic member 210 is a magnetic member that produces the large Barkhausen effect by a change in an external magnetic field. Shapes and arrangements of first magnetic sensing part 211 and second magnetic sensing part 212 are, for example, the same as those of first magnetic sensing part 111 and second magnetic sensing part 112 described above.

Magnetic member 210 used in power generation element 200 is a magnetic member manufactured by the following manufacturing method.

Manufacturing Method

Figure 11:
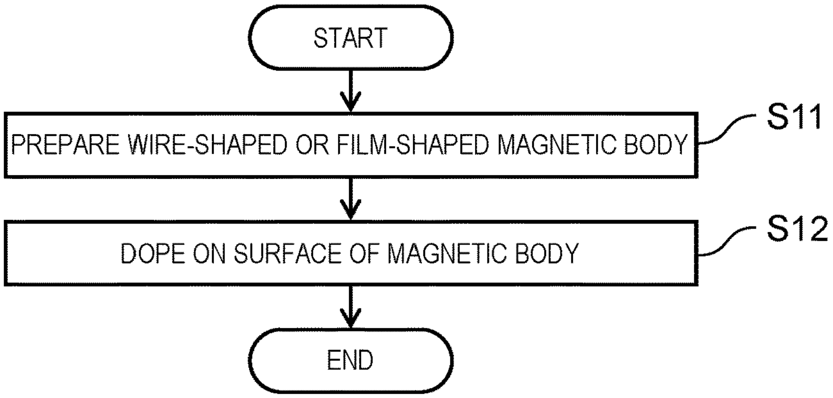
FIG. 11 is a flowchart of a method of manufacturing a magnetic member according to the second exemplary embodiment.

A method of manufacturing magnetic member 210 will be described. FIG. 11 is a flowchart of a method of manufacturing magnetic member 210.

As illustrated in FIG. 11, in the method of manufacturing magnetic member 210, first, a wire-shaped or film-shaped magnetic body is prepared (step S11). First magnetic sensing part 211 and second magnetic sensing part 212 described above are formed in a wire-shaped or film-shaped magnetic body. As a material of the wire-shaped or film-shaped magnetic body, for example, a magnetic material having a coercive force of 20 Oe or less is used.

Next, a surface of the wire-shaped or film-shaped magnetic body is doped with an element for increasing the coercive force of the magnetic body (step S12). In a case where the magnetic body has a wire shape, for example, a surface to be an outer surface of the magnetic body is doped with an element. As a result, the coercive force only in the vicinity of the magnetic body surface is increased by grain boundary diffusion of the element from the magnetic body surface. As a result, first magnetic sensing part 211 is formed at the central part of the magnetic body, and second magnetic sensing part 212 is formed in the vicinity of the surface of the magnetic body. Examples of the element doping method include a method in which a minute powder containing an element to be doped is embedded in a magnetic body and exposed to a high temperature to diffuse the doping element into the magnetic body. Furthermore, examples of the element for increasing the coercive force include Nd, Pr, Dy, Tb, Ho, T, Al, Cu, Co, Ga, Ti, V, Zr, Nb, and Mo. In a case where magnetic member 210 is manufactured in this manner, second magnetic sensing part 212 having hard magnetism is formed on a surface side of magnetic member 210, and first magnetic sensing part 211 having soft magnetism is formed on a center side of magnetic member 210. Furthermore, in a case where the magnetic body has a film shape, for example, at least one principal surface of the magnetic body is doped with an element.

By forming magnetic member 210 by such a manufacturing method, a coercive force and a thickness of second magnetic sensing part 212 to be formed can be precisely controlled by controlling doping conditions. Therefore, an amount of change in the magnetic flux density of magnetic member 210 in the large Barkhausen jump is stabilized. Therefore, the variations in the generated power of power generation element 200 can be reduced.

Third Exemplary Embodiment

Next, a third exemplary embodiment will be described. In the following description of the present exemplary embodiment, differences from the first exemplary embodiment and the second exemplary embodiment will be mainly described, and description of common points will be omitted or simplified.

Figure 12:
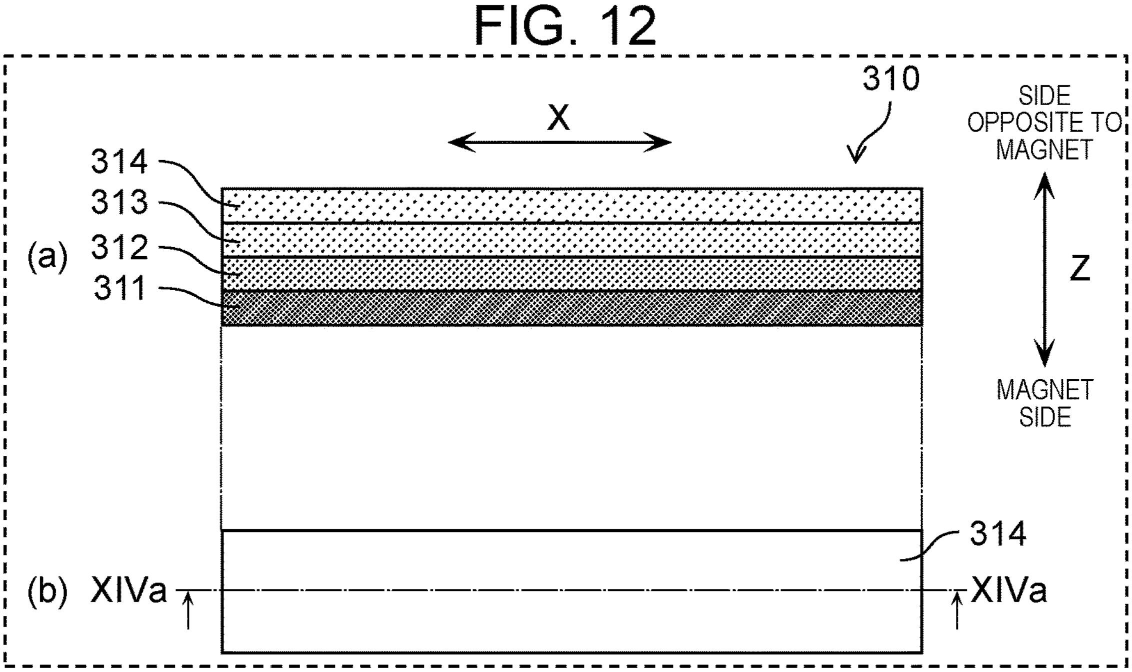
FIG. 12 is a cross-sectional view and a top view illustrating a schematic configuration of a magnetic member according to a third exemplary embodiment.

FIG. 12 is a cross-sectional view and a top view illustrating a schematic configuration of magnetic member 310 according to the present exemplary embodiment. Specifically, part (a) of FIG. 12 is a cross-sectional view of magnetic member 310, and part (b) of FIG. 12 is a top view of magnetic member 310 as viewed from above in part (a) of FIG. 12. Part (a) of FIG. 12 illustrates a cross section at a position indicated by line XIVa-XIVa in part (b) of FIG. 12. An encoder according to the present exemplary embodiment includes, for example, a power generation element using magnetic member 310 instead of power generation element 100 of encoder 1 according to the first exemplary embodiment. The power generation element according to the present exemplary embodiment includes, for example, magnetic member 310 instead of magnetic member 110 according to the first exemplary embodiment.

Magnetic member 310 is a magnetic member that produces the large Barkhausen effect by a change in an external magnetic field. Magnetic member 310 is used for a power generation element. Magnetic member 310 has a structure in which three or more magnetic sensitive layers 311, 312, 313, 314 are stacked. The shape of magnetic member 310 when viewed from the stacking direction is an elongated rectangle. A longitudinal direction of magnetic member 310 is the same as the winding axis direction. Furthermore, the longitudinal direction of magnetic member 310 is, for example, a direction orthogonal to the alignment direction. When viewed from the stacking direction, a length of magnetic member 310 in the longitudinal direction is, for example, twice or more a length of magnetic member 310 in the short direction. In the example illustrated in FIG. 12, the number of three or more magnetic sensitive layers 311, 312, 313, 314 is four, but may be three or five or more.

Three or more magnetic sensitive layers 311, 312, 313, 314 are stacked along a direction intersecting (for example, orthogonal to) the winding axis direction indicated by arrow X. In the illustrated example, three or more magnetic sensitive layers 311, 312, 313, 314 are stacked along the alignment direction indicated by arrow Z.

The coercive force of each of three or more magnetic sensitive layers 311, 312, 313, 314 increases in the order of alignment in the stacking direction. For example, among three or more magnetic sensitive layers 311, 312, 313, 314, the coercive force of magnetic sensitive layer 311 is the highest, and the coercive force of magnetic sensitive layer 314 is the lowest.

Each of three or more magnetic sensitive layers 311, 312, 313, 314 is made of a magnetic material, for example, the same magnetic material. Each of three or more magnetic sensitive layers 311, 312, 313, 314 has the coercive force in the above-described relationship due to, for example, different residual stresses. Since each of three or more magnetic sensitive layers 311, 312, 313, 314 is made of the same magnetic material, manufacturing can be performed without changing the magnetic material for each magnetic sensitive layer, and thus the manufacturing process can be simplified. Examples of the magnetic material include a material exhibiting a large Barkhausen jump due to a difference in residual stress, such as a bicalloy such as V—Fe—Co and an amorphous material such as Co—Fe—Si—B, Fe—Si—B, Fe—Ni, Fe—Si, and Fe—Si—Al. Note that each of three or more magnetic sensitive layers 311, 312, 313, 314 may be made of magnetic materials different from each other such that the coercive force has the above-described relationship.

A difference in coercive force between adjacent magnetic sensitive layers among three or more magnetic sensitive layers 311, 312, 313, 314 is equal, for example, in any combination of adjacent magnetic sensitive layers.

Since magnetic member 310 includes three or more magnetic sensitive layers 311, 312, 313, 314 stacked in this manner, the coercive force changes along the stacking direction, and the interaction of the magnetic flux in each magnetic sensitive layer can be stabilized. As a result, an amount of change in the magnetic flux density of magnetic member 310 in the large Barkhausen jump is stabilized. Therefore, it is possible to reduce the variations in the generated power of the power generation element using magnetic member 310.

Figure 13:
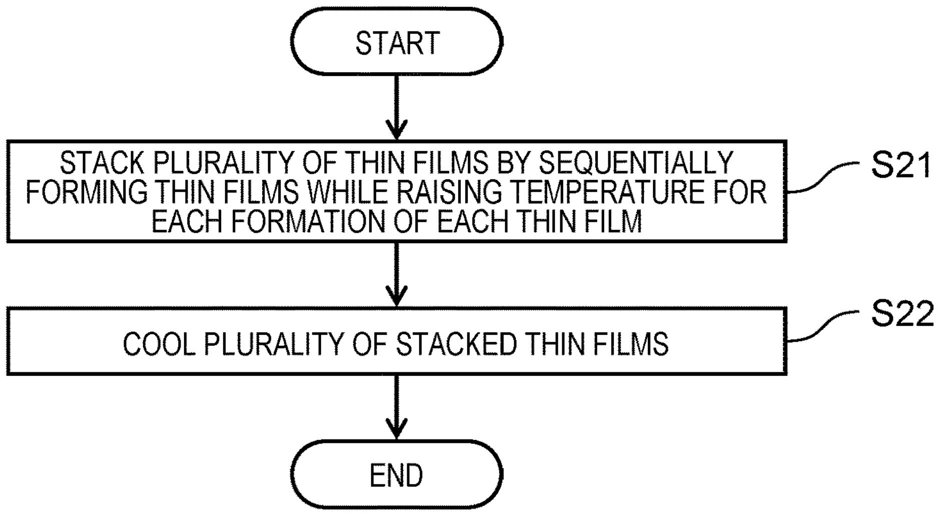
FIG. 13 is a flowchart of an example of a method of manufacturing the magnetic member according to the third exemplary embodiment.

Next, a method of manufacturing magnetic member 310 will be described. FIG. 13 is a flowchart of an example of a method of manufacturing magnetic member 310.

As illustrated in FIG. 13, in the method of manufacturing magnetic member 310, a plurality of thin films made of the same magnetic material are sequentially formed while raising a temperature for each formation of each thin film to be stacked (step S21). For example, a board for film formation is prepared, and the plurality of thin films are formed on the board. The plurality of thin films are formed by, for example, a sputtering method, an ion plating method, a vacuum vapor deposition method, or the like. Note that, in step S21, the plurality of thin films may be sequentially formed while the temperature is lowered for each formation of each thin film.

Next, the plurality of stacked thin films are cooled (step S22). The plurality of thin films are cooled, for example, from a temperature at the time of formation of the last thin film among formations of the plurality of thin films to normal temperature (for example, about 23° C.). As a result, since the plurality of thin films are stacked in this order and the temperature at the time of film formation is high, the residual stress generated at the time of cooling the plurality of thin films becomes larger as the thin films are stacked later. Since the coercive force tends to be lower as the residual stress is larger, the coercive force of each of the plurality of thin films becomes smaller as the thin films are stacked later due to this difference in residual stress. As a result, magnetic member 310 having a stacked structure in which the coercive force of each of three or more magnetic sensitive layers 311, 312, 313, 314 increases in the alignment order in the stacking direction is formed. Note that, in step S21, in a case where a plurality of thin films is sequentially formed while the temperature is lowered for each formation of each thin film, the coercive force of each of three or more magnetic sensitive layers 311, 312, 313, 314 is lowered in the alignment order in the stacking direction.

Note that the method of manufacturing magnetic member 310 is not limited to the above-described example, and for example, magnetic member 310 may be formed by stacking the plurality of thin films under different film formation conditions for each formation of each thin film. At this time, for example, the film formation conditions such as the degree of vacuum at the time of film formation or a film formation rate are changed in one direction to form each thin film.

Fourth Exemplary Embodiment

Next, a fourth exemplary embodiment will be described. In the following description of the present exemplary embodiment, differences from the first exemplary embodiment to the third exemplary embodiment will be mainly described, and description of common points will be omitted or simplified.

Figure 14:
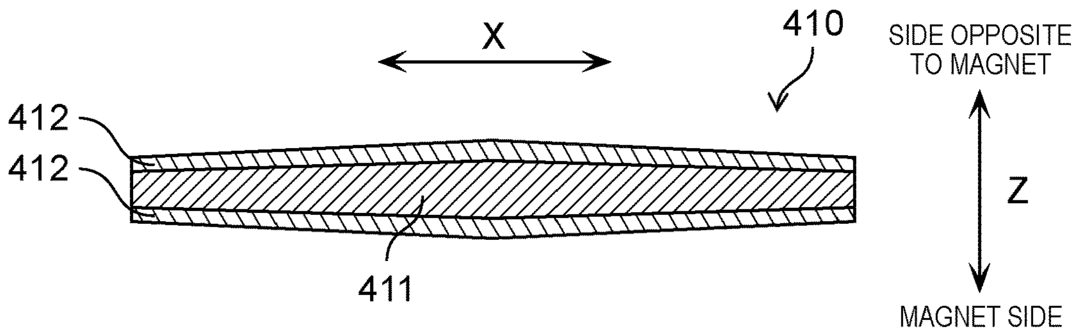
FIG. 14 is a cross-sectional view illustrating a schematic configuration of a magnetic member according to a fourth exemplary embodiment.

FIG. 14 is a cross-sectional view illustrating a schematic configuration of magnetic member 410 according to the present exemplary embodiment. An encoder according to the present exemplary embodiment includes, for example, a power generation element using magnetic member 410 instead of power generation element 100 of encoder 1 according to the first exemplary embodiment. The power generation element according to the present exemplary embodiment includes, for example, magnetic member 410 instead of magnetic member 110 according to the first exemplary embodiment.

Magnetic member 410 is a magnetic member that produces the large Barkhausen effect by a change in an external magnetic field. Magnetic member 410 includes first magnetic sensing part 411 and second magnetic sensing part 412 having magnetic characteristics different from those of first magnetic sensing part 411. In the present exemplary embodiment, second magnetic sensing part 412 has a lower coercive force than first magnetic sensing part 411 and is soft magnetic. Magnetic member 410 is, for example, an elongated member in which the winding axis direction is the longitudinal direction. Magnetic member 410 has, for example, a wire shape. The cross-sectional shape of magnetic member 410 cut in the radial direction is, for example, a circular shape or an elliptical shape, but may be another shape such as a rectangular shape or a polygonal shape. In a case where magnetic member 410 has a wire shape, first magnetic sensing part 411 constitutes a central part of magnetic member 410, and second magnetic sensing part 412 constitutes an outer peripheral part of magnetic member 410 in the radial direction.

In the present exemplary embodiment, in magnetic member 410, for example, the central part is first magnetic sensing part 411 having a high coercive force, and the outer peripheral part is second magnetic sensing part 412 having a low coercive force. First magnetic sensing part 411 and second magnetic sensing part 412 each extend in the winding axis direction. First magnetic sensing part 411 and second magnetic sensing part 412 each have, for example, an elongated shape extending in the winding axis direction. Specifically, first magnetic sensing part 411 has a wire shape extending in the winding axis direction, and second magnetic sensing part 412 has a tubular shape extending in the winding axis direction. Second magnetic sensing part 412 covers a surface to be an outer periphery of first magnetic sensing part 411 when viewed from the winding axis direction. First magnetic sensing part 411 and second magnetic sensing part 412 are aligned in a direction intersecting (for example, orthogonal to) the winding axis direction. Note that magnetic member 410 is not limited to such a shape, and may be any magnetic member that produces the large Barkhausen effect by including first magnetic sensing part 411 and second magnetic sensing part 412 having different magnetic characteristics. For example, in magnetic member 410, the central part may be second magnetic sensing part 412, and the outer peripheral part may be first magnetic sensing part 411. Furthermore, magnetic member 410 may be, for example, a magnetic member having a structure in which thin films having different magnetic characteristics are stacked.

First magnetic sensing part 411 has a larger cross-sectional area when cut in a direction orthogonal to the winding axis direction from both ends toward the center in the winding axis direction. In a case where first magnetic sensing part 411 has a wire shape, a diameter of first magnetic sensing part 411 increases from both ends toward the center in the winding axis direction. In first magnetic sensing part 411, the diameter of the central part is the largest and the cross-sectional area of the central part is the largest in the winding axis direction. Examples of the material constituting first magnetic sensing part 411 include a magnetic material having a coercive force of 60 Oe or more.

Second magnetic sensing part 412 has a larger cross-sectional area when cut in a direction orthogonal to the winding axis direction from both ends toward the center in the winding axis direction. For example, a thickness of second magnetic sensing part 412 increases from both ends toward the center in the winding axis direction. In a case where the cross-sectional areas at the same position in the winding axis direction are compared between first magnetic sensing part 411 and second magnetic sensing part 412, for example, the ratio is constant at any position. Examples of the material constituting second magnetic sensing part 412 include a magnetic material having a coercive force of 20 Oe or less.

In magnetic member 410, as described above, the cross-sectional area of first magnetic sensing part 411 that is hard magnetic is large in the central part of magnetic member 410 that is easily affected by the external magnetic field. Furthermore, the influence of the external magnetic field tends to remain in first magnetic sensing part 411 that is hard magnetic. For example, when the influence of the external magnetic field remains, the magnetic flux inside first magnetic sensing part 411 is biased. Therefore, originally, as illustrated in FIG. 1, the same degree of change in the magnetic flux density occurs in the two large Barkhausen jumps, but due to the bias of the magnetic flux of first magnetic sensing part 411, the magnetization state of second magnetic sensing part 412 before reversal also changes between the two large Barkhausen jumps, and a difference in the amount of change in the magnetic flux density occurs in the two large Barkhausen jumps. Therefore, electric power generated in the coil wound around magnetic member 410 varies. Even in a case where a strong magnetic field is applied to magnetic member 410, first magnetic sensing part 411 that is hard magnetic becomes thick in the central part of magnetic member 410, so that the resistance of first magnetic sensing part 411 to the magnetic field increases, and the influence of the external magnetic field is less likely to remain in first magnetic sensing part 411. Therefore, the difference in the change amount of the magnetic flux density between the two large Barkhausen jumps is reduced. Therefore, it is possible to reduce the variations in the generated power of the power generation element using magnetic member 410.

Fifth Exemplary Embodiment

Next, a fifth exemplary embodiment will be described. In the following description of the present exemplary embodiment, differences from the first exemplary embodiment to the fourth exemplary embodiment will be mainly described, and description of common points will be omitted or simplified.

Figure 15:
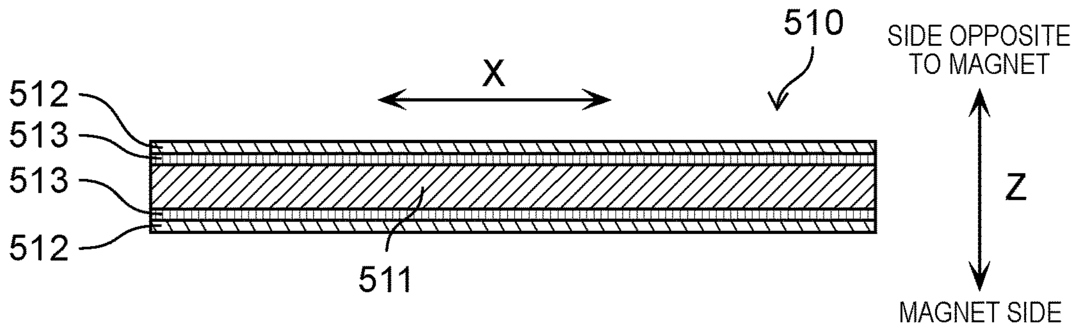
FIG. 15 is a cross-sectional view illustrating a schematic configuration of a magnetic member according to a fifth exemplary embodiment.

FIG. 15 is a cross-sectional view illustrating a schematic configuration of magnetic member 510 according to the present exemplary embodiment. An encoder according to the present exemplary embodiment includes, for example, a power generation element using magnetic member 510 instead of power generation element 100 of encoder 1 according to the first exemplary embodiment. The power generation element according to the present exemplary embodiment includes, for example, magnetic member 510 instead of magnetic member 110 according to the first exemplary embodiment.

Magnetic member 510 is a magnetic member that produces the large Barkhausen effect by a change in an external magnetic field. Magnetic member 510 includes first magnetic sensing part 511, second magnetic sensing part 512 having magnetic characteristics different from those of first magnetic sensing part 511, and non-magnetic part 513 that is not substantially magnetized by an external magnetic field. Magnetic member 510 is, for example, an elongated member in which the winding axis direction is the longitudinal direction. Magnetic member 510 has, for example, a wire shape or a film shape. FIG. 15 illustrates an example in which magnetic member 510 has a wire shape. The cross-sectional shape of magnetic member 510 cut in the radial direction is, for example, a circular shape or an elliptical shape, but may be another shape such as a rectangular shape or a polygonal shape.

First magnetic sensing part 511 has, for example, a wire shape or a film shape. FIG. 15 illustrates an example in which first magnetic sensing part 511 has a wire shape extending in the winding axis direction. First magnetic sensing part 511 extends in the winding axis direction.

Second magnetic sensing part 512 covers non-magnetic part 513 from a side opposite to a side of first magnetic sensing part 511 in non-magnetic part 513. Second magnetic sensing part 512 has, for example, a film shape or a tubular shape. FIG. 15 illustrates an example in which second magnetic sensing part 512 has a tubular shape extending in the winding axis direction. Second magnetic sensing part 512 extends in the winding axis direction. Second magnetic sensing part 512 contains, for example, first magnetic sensing part 511 and non-magnetic part 513. First magnetic sensing part 511 and second magnetic sensing part 512 are separated from each other with non-magnetic part 513 interposed therebetween.

One of first magnetic sensing part 511 and second magnetic sensing part 512 is a hard magnetic part having a higher coercive force than the other, and the other is a soft magnetic part. In magnetic member 510, first magnetic sensing part 511 may be a hard magnetic part, and second magnetic sensing part 512 may be a hard magnetic part. Examples of a material constituting the hard magnetic part include a magnetic material having a coercive force of 60 Oe or more. Furthermore, examples of a material constituting the soft magnetic part include a magnetic material having a coercive force of 20 Oe or less.

Non-magnetic part 513 covers first magnetic sensing part 511 from a direction intersecting (for example, orthogonal to) the winding axis direction. Non-magnetic part 513 has, for example, a film shape or a tubular shape. FIG. 15 illustrates an example in which non-magnetic part 513 has a tubular shape extending in the winding axis direction. Non-magnetic part 513 extends in the winding axis direction. Non-magnetic part 513 contains, for example, first magnetic sensing part 511. Non-magnetic part 513 is located between first magnetic sensing part 511 and second magnetic sensing part 512. Examples of a material constituting non-magnetic part 513 include Ag, Cu, and Au.

Note that, in a case where first magnetic sensing part 511, second magnetic sensing part 512, and non-magnetic part 513 have a film shape, for example, first magnetic sensing part 511, non-magnetic part 513, and second magnetic sensing part 512 are stacked in this order along a direction orthogonal to the winding axis direction.

Magnetic member 510 is manufactured, for example, as follows. First, a magnetic body to be wire-shaped or film-shaped first magnetic sensing part 511 is prepared. Next, first magnetic sensing part 511 is covered with non-magnetic part 513 using a PVD method, a CVD method, a plating method, or the like. Then, non-magnetic part 513 covering first magnetic sensing part 511 is covered with second magnetic sensing part 512 using a PVD method, a CVD method, a plating method, or the like.

As described above, in magnetic member 510, non-magnetic part 513 is located between first magnetic sensing part 511 and second magnetic sensing part 512. In a case where non-magnetic part 513 is not present, in the vicinity of an interface between first magnetic sensing part 511 and second magnetic sensing part 512, a magnetization state between first magnetic sensing part 511 and second magnetic sensing part 512 is brought about, and there is a possibility that an intermediate layer in which the magnetization state is unstable is generated. Since the magnetization state of the intermediate layer fluctuates, there is a possibility that the amount of change in the magnetic flux density of the magnetic member in the large Barkhausen jump fluctuates. Due to the presence of non-magnetic part 513, first magnetic sensing part 511 and second magnetic sensing part 512 are separated from each other, and the intermediate layer is less likely to be generated, so that it is possible to suppress the fluctuation in the amount of change in the magnetic flux density of the magnetic member in the large Barkhausen jump. Therefore, it is possible to reduce the variations in the generated power of the power generation element using magnetic member 510.

Sixth Exemplary Embodiment

Next, a sixth exemplary embodiment will be described. In the following description of the present exemplary embodiment, differences from the first exemplary embodiment to the fifth exemplary embodiment will be mainly described, and description of common points will be omitted or simplified.

Figure 16:
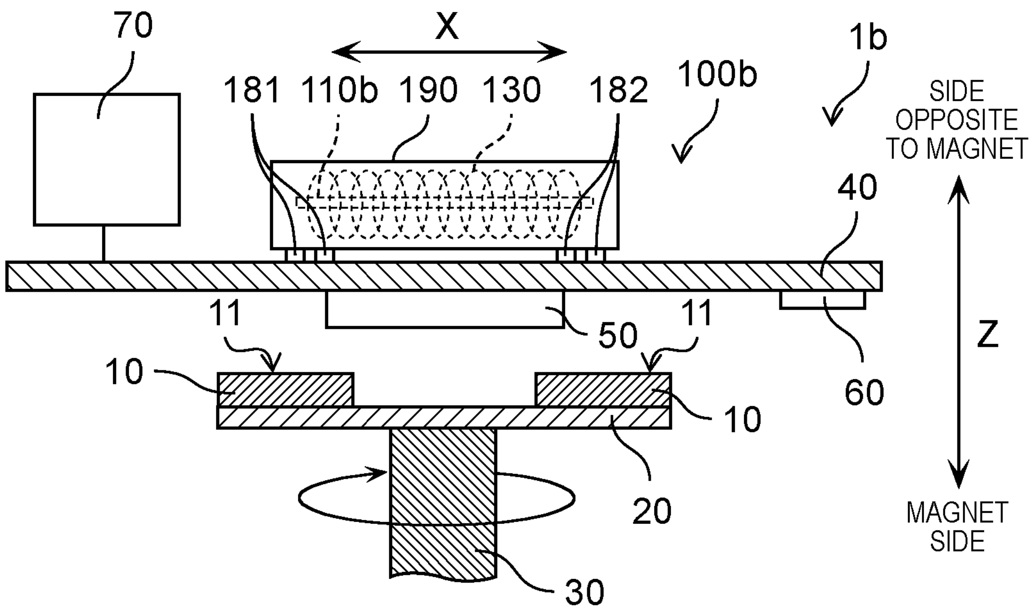
FIG. 16 is a cross-sectional view illustrating a schematic configuration of an encoder according to a sixth exemplary embodiment.

FIG. 16 is a cross-sectional view illustrating a schematic configuration of encoder 1*b* according to the present exemplary embodiment.

As illustrated in FIG. 16, encoder 1*b* is different from encoder 1 in that power generation element 100*b* is provided instead of power generation element 100, and demagnetization circuit 70 is further provided.

Power generation element 100*b* has the same configuration as power generation element 100 except that magnetic member 110*b* is provided instead of magnetic member 110 of power generation element 100. Magnetic member 110*b* is a magnetic member including a soft magnetic part and a hard magnetic part and producing the large Barkhausen effect, and is, for example, a composite magnetic wire such as a Wiegand wire. Furthermore, as magnetic member 110*b*, the magnetic member according to any one of the second exemplary embodiment to the fifth exemplary embodiment may be used.

Demagnetization circuit 70 is a circuit for applying an alternating current for demagnetizing magnetic member 110*b* to coil 130. Demagnetization circuit 70 is electrically connected to coil 130 via, for example, board 40 that is a wiring board. Demagnetization circuit 70 demagnetizes magnetic member 110*b* by causing an alternating current that gradually attenuates to coil 130 to flow. Demagnetization circuit 70 may be a circuit through which an alternating current that gradually attenuates flows, or may be a circuit through which a DC reverse current that gradually attenuates flows. Demagnetization circuit 70 demagnetizes magnetic member 110*b* under the control of control circuit 50, for example. Demagnetization circuit 70 may demagnetize magnetic member 110*b* by receiving an operation of a user of encoder 1*b* by an operation receiving unit such as a switch. Demagnetization circuit 70 is fixed to, for example, a case (not illustrated) constituting a part of encoder 1, a motor, or the like. Demagnetization circuit 70 may be mounted on board 40.

Figure 17:
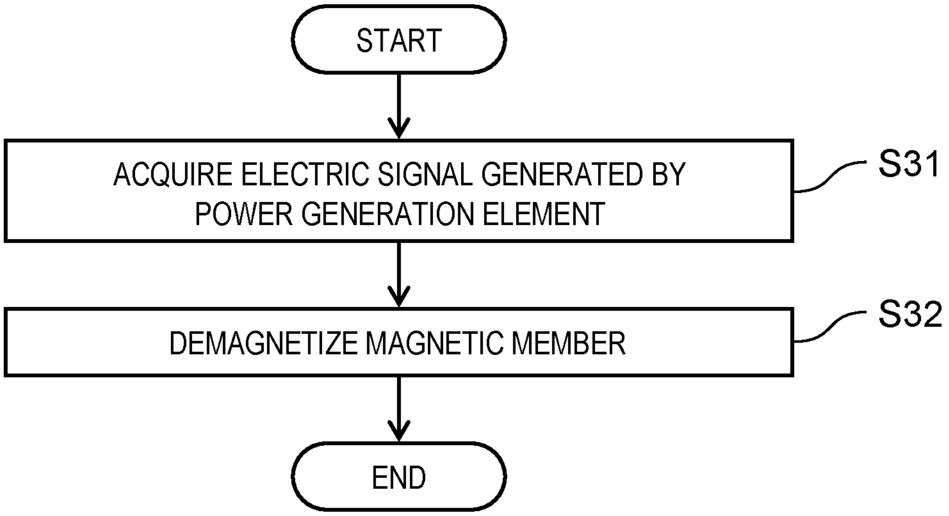
FIG. 17 is a flowchart illustrating an operation example of the encoder according to the sixth exemplary embodiment.

Next, an operation example of encoder 1*b* will be described. Specifically, the operation example of encoder 1*b* is an operation example of a signal acquisition method of acquiring an electric signal generated by power generation element 100*b* by a change in an external magnetic field. FIG. 17 is a flowchart of the operation example of encoder 1*b*.

As illustrated in FIG. 17, first, when the rotation of rotating shaft 30 is started, control circuit 50 acquires an electric signal generated by power generation element 100*b* (step S31). Control circuit 50 acquires, as an electric signal, a power generation pulse generated by power generation element 100*b* by a repeated change of the external magnetic field applied to power generation element 100*b*. The external magnetic field applied to power generation element 100*b* repeatedly changes as magnet 10 rotates together with rotating shaft 30 of a motor or the like.

Next, during the acquisition of the electric signal in step S31, control circuit 50 demagnetizes magnetic member 110*b* by demagnetization circuit 70 (step S32). For example, after starting the acquisition of the electric signal generated by power generation element 100*b*, control circuit 50 switches the electrical connection with coil 130 at a predetermined timing, and causes an alternating current that attenuates to coil 130 to flow using demagnetization circuit 70, thereby demagnetizing magnetic member 110*b*. For example, control circuit 50 repeats acquisition of an electric signal and demagnetization of magnetic member 110*b* for a predetermined period until the rotation of rotating shaft 30 ends.

When a large magnetic field is applied to power generation element 100*b* due to a change in the magnitude of the magnetic field formed by magnet 10, another magnetic field generation source, or the like, there is a possibility that the influence of the external magnetic field remains in the hard magnetic part having a high coercive force in magnetic member 110*b*. For example, when the influence of the external magnetic field remains, the magnetic flux inside the hard magnetic part is biased. Therefore, originally, as illustrated in FIG. 1, the magnetic flux density changes to the same extent in the two large Barkhausen jumps, but the magnetization state of the soft magnetic part before reversal also changes between the two large Barkhausen jumps due to the bias of the magnetic flux of the hard magnetic part, and an amount of change in the magnetic flux density differs between the two large Barkhausen jumps. Therefore, electric power generated in coil 130 varies. Therefore, by demagnetizing magnetic member 110*b*, the magnetic characteristics of magnetic member 110*b* (particularly, the hard magnetic part) can be returned to the initial state without bias, and the amount of change in the magnetic flux density between the two large Barkhausen jumps can be returned to the same degree. Therefore, the variations in the generated power of power generation element 100*b* can be reduced.

Note that step S32 may be performed before the electric signal is acquired in step S31. As a result, even if there is a history that a large magnetic field is applied to power generation element 100*b* before the acquisition of the electric signal, the demagnetization of magnetic member 110*b* is performed, so that an electric signal generated in a state in which there is no difference in the change amount of the magnetic flux density between the two large Barkhausen jumps can be acquired.

Other Exemplary Embodiments

Although the power generation element and the encoder according to the present disclosure have been described above based on the exemplary embodiments, the present disclosure is not limited to the above exemplary embodiments. The present disclosure also includes a mode obtained by applying various modifications conceived by those skilled in the art to each of the above exemplary embodiments, and a mode realized by arbitrarily combining components and functions in different exemplary embodiments without departing from the gist of the present disclosure.

For example, in the above exemplary embodiment, the rotary encoder used in combination with the motor has been described as an example, but the present disclosure is not limited thereto. The technique of the present disclosure can also be applied to a linear encoder.

INDUSTRIAL APPLICABILITY

The power generation element, the encoder, and the like according to the present disclosure are useful for equipment, devices, and the like that rotate or move linearly, such as motors.

REFERENCE MARKS IN THE DRAWINGS

1, 1*a*, 1*b*: encoder
10, 10*a*: magnet
20: rotating plate
30: rotating shaft
40: board
50: control circuit
60: memory
70: demagnetization circuit
100, 100*a*, 100*b*, 200: power generation element
110, 110*b*, 210, 310, 410, 510: magnetic member
111, 211, 411, 511: first magnetic sensing part
112, 212, 412, 512: second magnetic sensing part
130: coil
150: ferrite member
153: opening
170: bias magnet
181, 182: terminal
190: housing
311, 312, 313, 314: magnetic sensitive layer
513: non-magnetic part
R1: winding axis

The invention claimed is:

1. A power generation element comprising:
- a magnetic member that produces a large Barkhausen effect by a change in an external magnetic field;
- a coil wound around the magnetic member; and
- a ferrite member disposed at an end of the magnetic member so as to be aligned with the coil along a winding axis direction of the coil, wherein:
- the magnetic member includes a first magnetic sensing part and a second magnetic sensing part having softer magnetism than magnetism of the first magnetic sensing part,
- the first magnetic sensing part is magnetized in the winding axis direction of the coil, and has a magnetization direction that does not change due to a change in a direction of the external magnetic field, and
- the ferrite member comprises two ferrite members facing each other with the coil interposed therebetween.

2. The power generation element according to claim 1, further comprising
- a bias magnet that applies a magnetic field in a direction same as the magnetization direction of the first magnetic sensing part to the magnetic member.

3. An encoder comprising:

a magnet that rotates together with a rotating shaft; and the power generation element according to claim 1 that generates an electric signal by a change in a magnetic field formed by the magnet due to rotation of the magnet.

4. A power generation element comprising:

a magnetic member that produces a large Barkhausen effect by a change in an external magnetic field; and a coil wound around the magnetic member, wherein the magnetic member has a structure in which three or more magnetic sensitive layers are stacked, and each of the three or more magnetic sensitive layers has a coercive force that increases in order of alignment in a stacking direction.

5. The power generation element according to claim 4, wherein each of the three or more magnetic sensitive layers includes a same magnetic material.

6. A power generation element comprising:

a magnetic member that produces a large Barkhausen effect by a change in an external magnetic field; and a coil wound around the magnetic member, wherein;

the magnetic member includes a first magnetic sensing part extending in a winding axis direction of the coil, and a second magnetic sensing part having softer magnetism than the first magnetic sensing part and aligned with the first magnetic sensing part in a direction intersecting the winding axis direction of the coil, the first magnetic sensing part has a larger cross-sectional area when cut in a direction orthogonal to the winding axis direction of the coil from both ends toward a center in the winding axis direction of the coil, the second magnetic sensing part has a larger cross-sectional area when cut in the direction orthogonal to the winding axis direction of the coil from both ends toward the center in the winding axis direction of the coil, and a ratio of the cross-sectional area of the first magnetic sensing part to the cross-sectional area of the second magnetic sensing part at a same position in the winding axis direction is constant at any position in the winding axis direction.

7. A power generation element comprising:

a magnetic member that produces a large Barkhausen effect by a change in an external magnetic field; and a coil wound around the magnetic member, wherein the magnetic member includes a first magnetic sensing part having a wire shape or a film shape, a non-magnetic part that covers the first magnetic sensing part from a direction intersecting a winding axis direction of the coil and is not magnetized by the external magnetic field, and a second magnetic sensing part that covers the non-magnetic part from a side opposite to a side of the first magnetic sensing part in the non-magnetic part and has magnetic characteristics different from those of the first magnetic sensing part, wherein one of the first magnetic sensing part or the second magnetic sensing part has a cohesive force of 60 Oe or more, and another of the first magnetic sensing part or the second magnetic sensing part has a cohesive force of 20 Oe or less.

8. The power generation element according to claim 7, wherein the magnetic member consists of the first magnetic sensing part, the non-magnetic part and the second magnetic sensing part.

9. A signal acquisition method of acquiring an electric signal generated by a power generation element including a magnetic member that produces a large Barkhausen effect by a change in an external magnetic field and a coil wound around the magnetic member, the magnetic member being disposed over a first surface of a substrate, the signal acquisition method comprising:

rotating a rotating plate on which a plurality of magnets are disposed to generate the change in the external magnetic field, the substrate being disposed between the rotating plate and the power generation element;

acquiring the electric signal generated by the power generation element by repeatedly changing the external magnetic field applied to the power generation element; and demagnetizing the magnetic member during or before acquisition of the electric signal.

10. The signal acquisition method of claim 9, wherein a circuit is disposed on a second surface of the substrate opposite the first surface to acquire the electric signal.

* * * * *